Oct. 17, 1967      J. O. MELTON      3,347,524
CONTROL DEVICE FOR DRILLING APPARATUS
Filed March 30, 1959      8 Sheets-Sheet 1

INVENTOR
James O. Melton

BY
Stevens, Davis, Miller & Mosher
ATTORNEYS

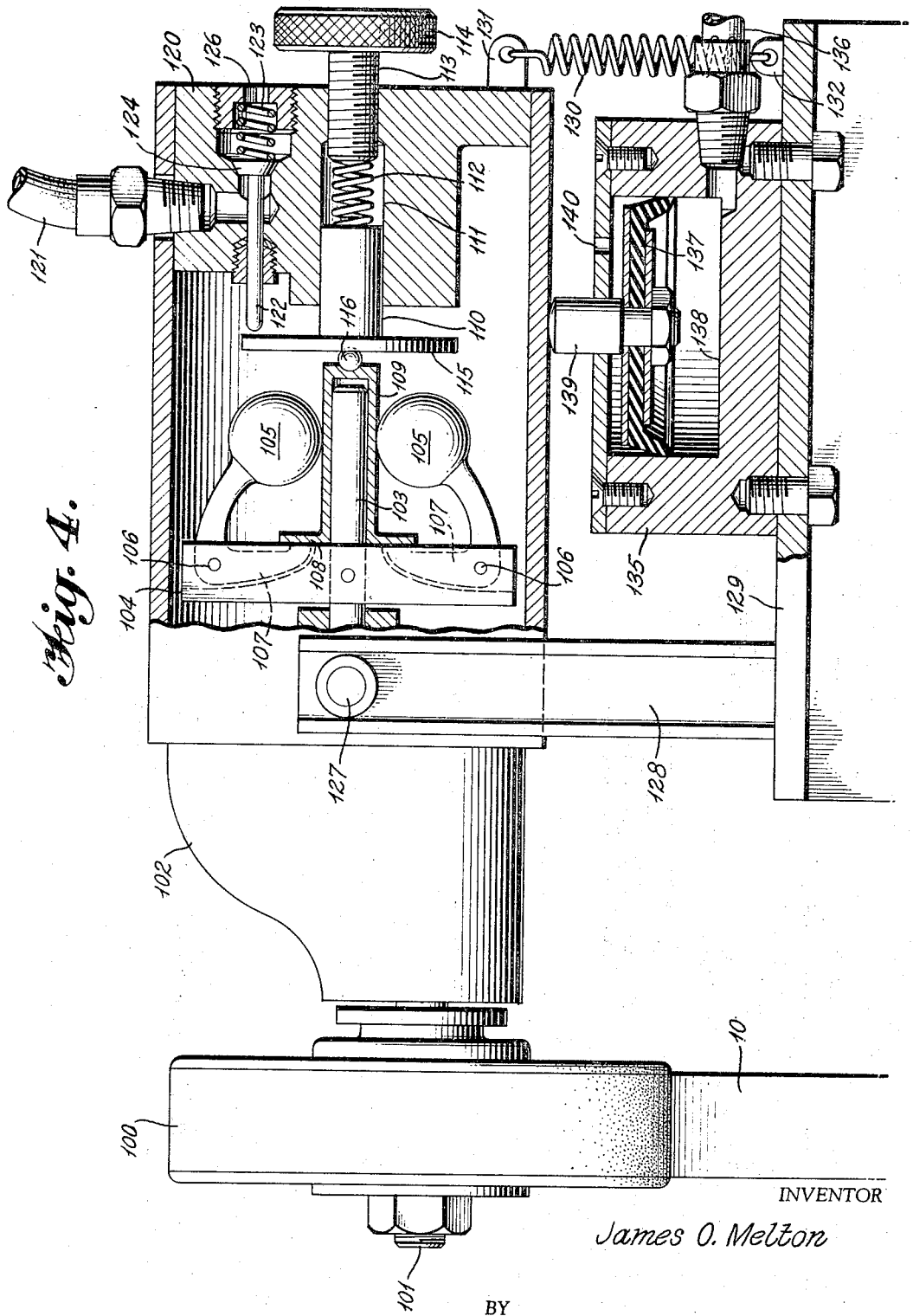

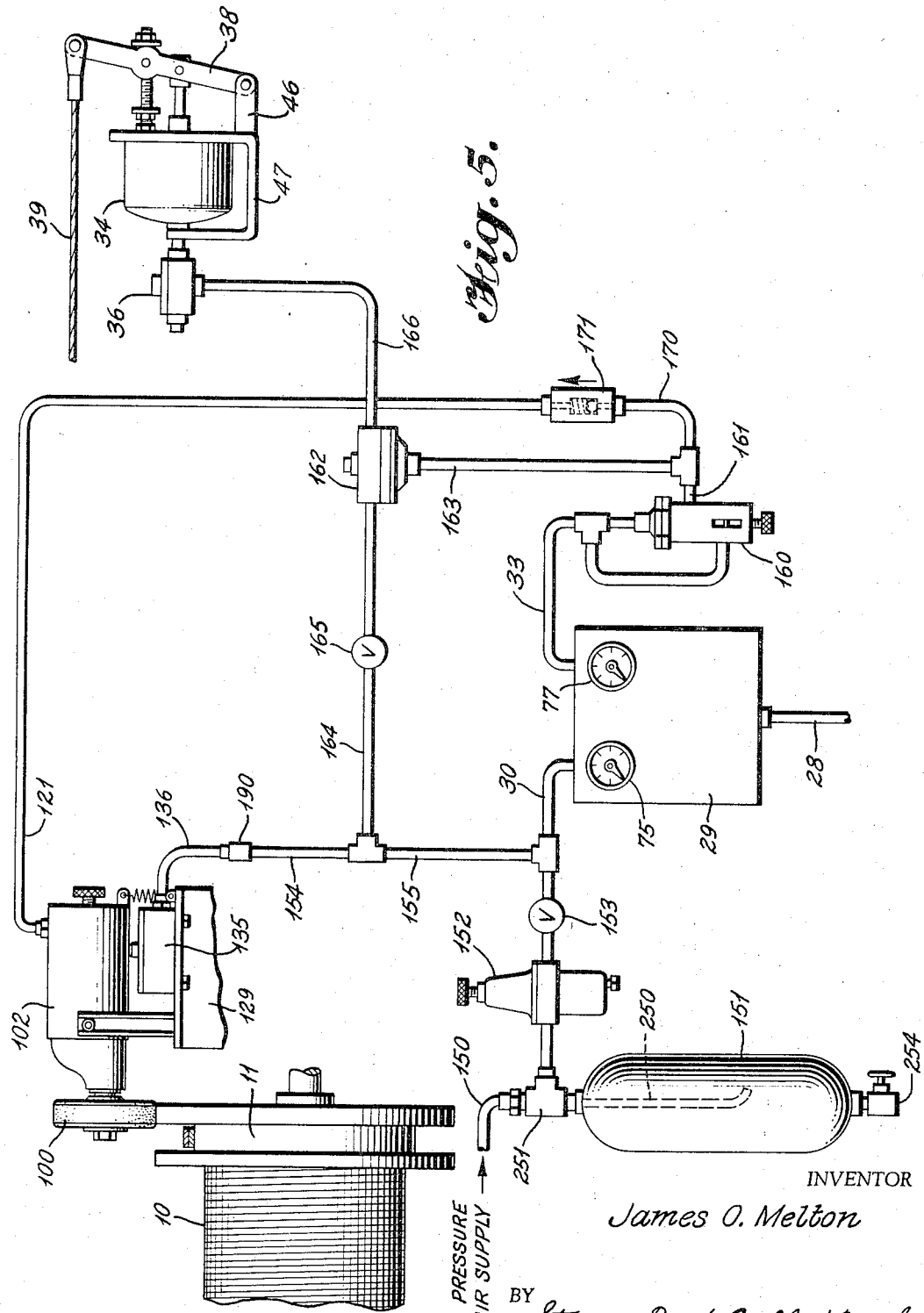

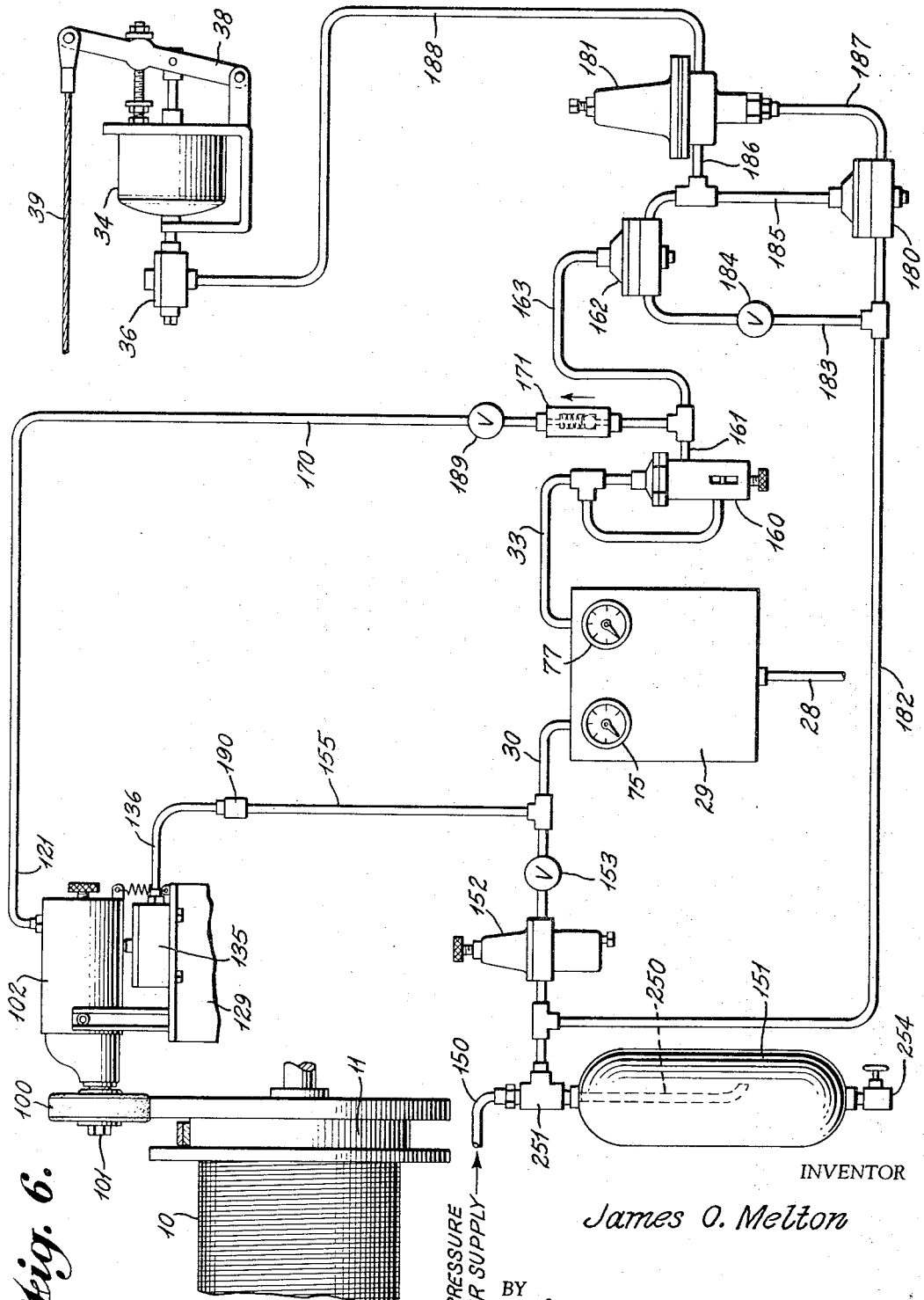

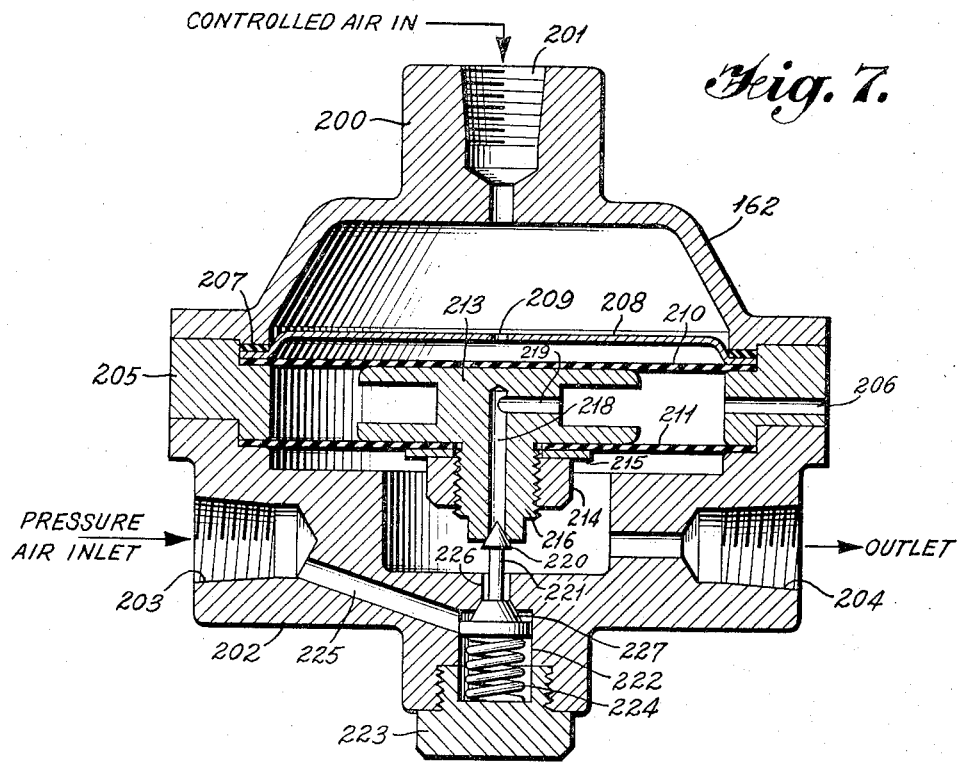
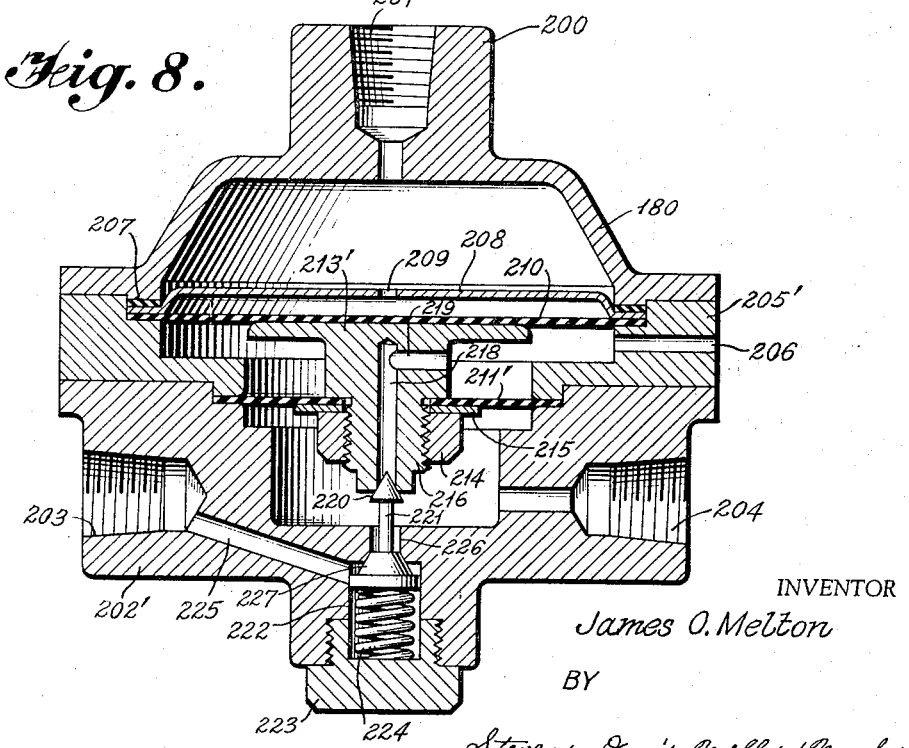

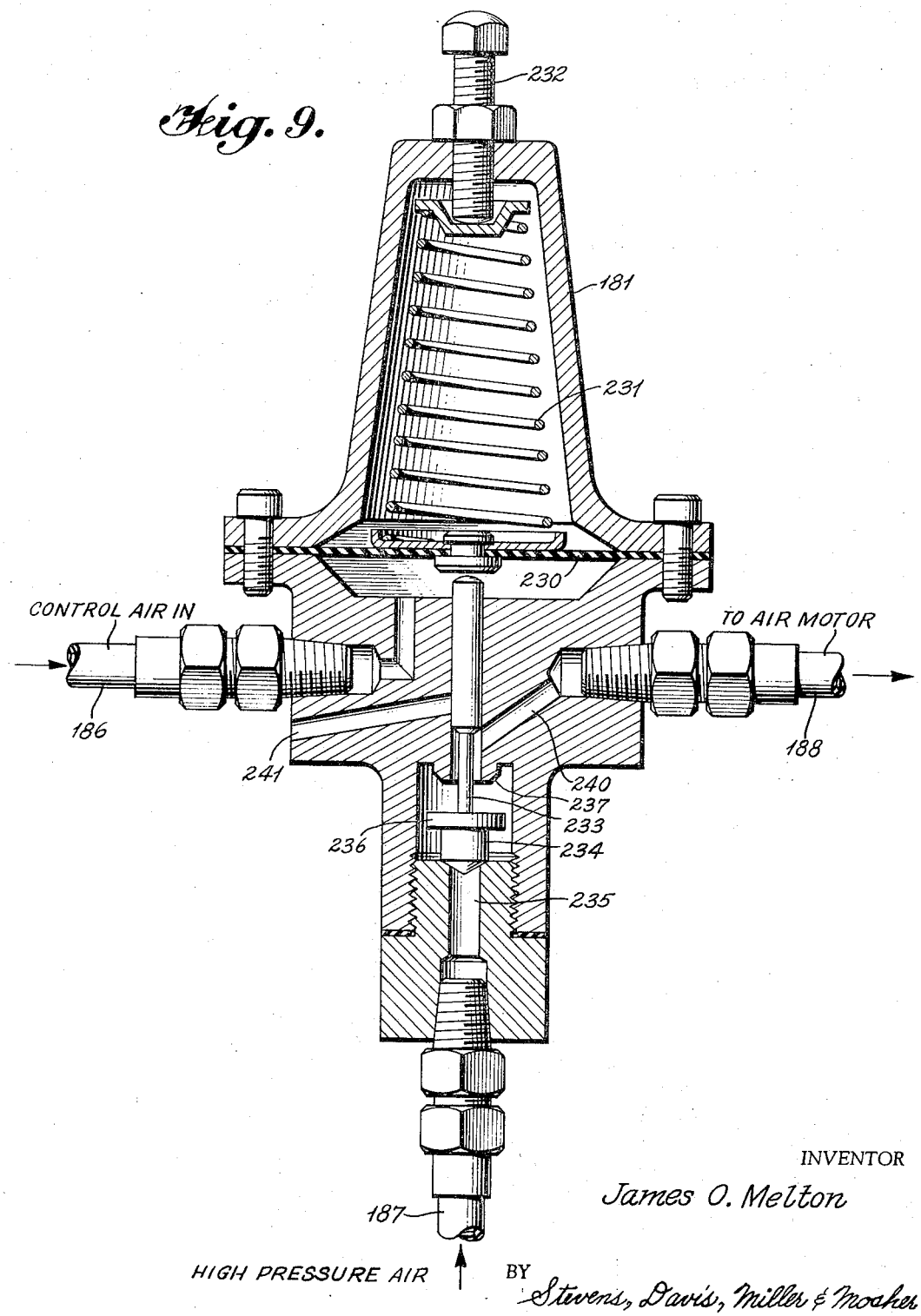

United States Patent Office 3,347,524
Patented Oct. 17, 1967

3,347,524
CONTROL DEVICE FOR DRILLING
APPARATUS
James O. Melton, Norman, Okla., assignor to The Geolograph Company, Oklahoma City, Okla., a corporation of Oklahoma
Filed Mar. 30, 1959, Ser. No. 802,968
17 Claims. (Cl. 254—173)

The present invention relates to an apparatus capable of use in connection with a drilling rig and more particularly the present invention relates to an apparatus capable of controlling, in an automatic manner, the weight exerted against the drill bit of a rotary drilling rig, as will hereinafter appear in detail.

The rate of drilling, or the rate of penetration of the drill bit into the ground, will depend primarily upon the hardness of the earth layer which the bit engages; this drilling rate, within certain limits, will also depend upon the load or weight applied to the bit, which in turn depends upon the rate at which the drill string is lowered. Logically enough, it has been ascertained that the feed or lowering rate of the drill string should be correlated with the penetration rate of the drill bit in order achieve optimum drilling; it has appeared further that the simplest method of effecting this correlation is by measuring and controlling the weight on the drill bit. Therefore, in present day practice, the operator of a conventional drilling rig attempts to sense the weight changes on the bit and, accordingly "feeds off" sufficient amount of drilling line in order to maintain a substantially constant weight on the bit. The operator accomplishes this result by first watching a weight indicator which is attached to the "dead line" at the drilling rig; then, as the weight increases beyond a predetermined value, the operator releases a braking means associated with the drilling line so as to feed off the proper amount of additional line. This latter procedure is, of course, entirely manual.

The present invention relates to an apparatus of the type described above, and including those elements described above, wherein there is provided a feed control means which is completely automatic. The system of the present invention includes (a) a sensing device which bears against the "dead line" of the drilling rig and which transmits a pressure portional to the tension in the dead line; (b) a control unit which is connected to the sensing unit and which provides a pneumatic pressure output responsive and proportional to the pressure transmitted from the sensing device; (c) an air motor connected to the braking mechanism and to the control device for the purpose of releasing and engaging the braking mechanism in response to the pressure at the sensing device; and (d) a plurality of intermediate elements adapted to eliminate any lag in response and, at the same time, to provide safety features in the control system itself.

Therefore, it is a principal object of the present invention to provide an improved system for maintaining the weight on the drill bit substantially constant.

It is another important object of the present invention to provide an automatic control system of the type referred to above wherein the elements constituting the control system may be simply attached, or added, to a conventional drilling rig without requiring any further modification or changes in the structure of the drilling rig itself.

It is a further object of the present invention to provide an automatic control system of the type referred to above wherein the brake control means is made completely responsive to the change in the tension in the dead line and wherein response lags are minimized or eliminated entirely.

A further important object of the present invention is to provide an automatic control system of the type referred to above wherein safety means are included to cause engagement of the brake when the tension in the dead line exceeds a certain predetermined value due to the passage of the drill bit into a gas pocket, or due to a break-off, or other similar condition.

Other and further objects and advantageous features of the present invention will hereinafter more fully appear in connection with a detailed description of the drawings which:

FIGURE 4 is a fragmentary side elevation, partly in section showing the governor employed in the present invention;

FIGURE 5 is a pneumatic circuit diagram showing a modification of the circuit shown of FIGURE 1;

FIGURE 6 is another pneumatic circuit diagram similar to FIGURE 5, but showing further modification thereof;

FIGURES 7 and 8 are section views showing, in detail, the one-to-one and three-to-one relays, respectively;

FIGURE 9 is a section view showing the details of the three-way valve; and

FIGURE 10 is a fragmentary sectional view, on an enlarged scale, showing additional details of the air scrubber shown in FIGURES 5 and 6.

Figure 1:
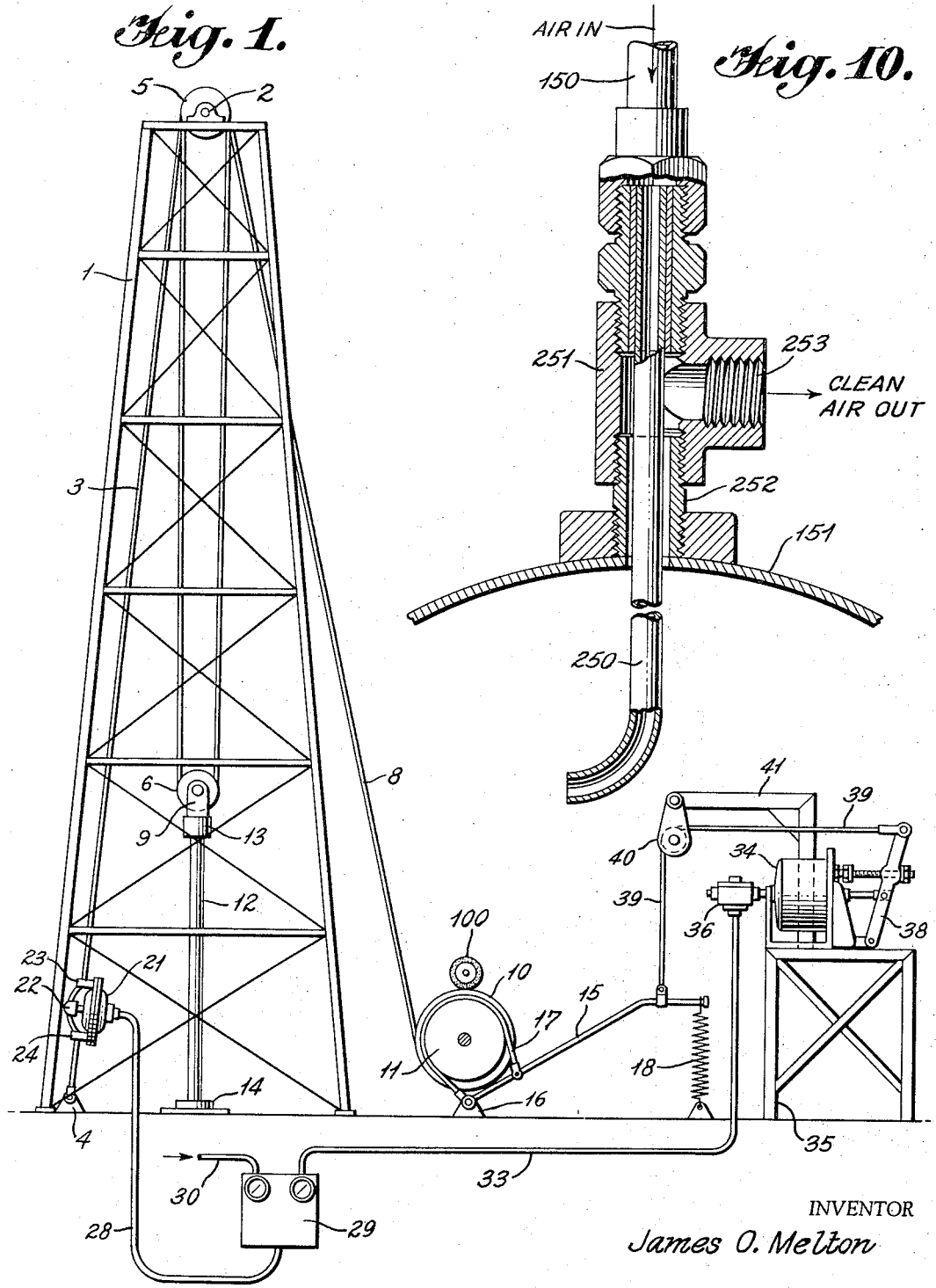
FIGURE 1 is a view in elevation, partly diagrammatic, showing a conventional drilling rig employing the novel control system of the present invention.

Referring to the drawings in detail, FIGURE 1 shows a conventional derrick 1 supporting at its upper end a crown block 2, the latter including two or more conventional pulleys. A cable 3, secured at one end 4 to the frame of the derrick passes around one pulley 5 of the crown block 2, then downwardly and around a pulley 6 in a movable or travelling block 9. From the travelling block the cable 3 passes upwardly and around a second pulley 5 of the crown block. The cable 3 may then pass downwardly to a winding drum 10. As many pulleys (or sheaves) 5 and 6 are included in the crown block and travelling block respectively, to provide the number of "lines" required to support the load.

The portion of the cable 3 extending from the anchor 4 to the crown block 2 is referred to as the "dead line." The portion of the cable extending from the crown block down to the winding drum 10 is referred to as the "fast line." Any conventional winding means including a motor, gears, clutches, etc. (which form no part of the present invention) may be employed for the purpose of driving the winding drum 10.

Travelling block 9 is connected to the kelly 12 through a swivel head 13, the kelly 12 extending through a rotary turntable 14; the drill string (not shown) is secured to the lower end of the kelly 12 and carries at its lower end a suitable bit (not shown) for drilling through the various earth formations.

Adjacent the one end of winding drum 10 there is shown, diagrammatically, a braking mechanism consisting of a brake arm 15 pivotally mounted on a support 16 and a brake band 17 which bears against a brake drum 11 secured to one end of the winding drum 10. At the right-hand end of the brake arm 15 there is a spring 18 which is of sufficient size to urge the brake band 17 against the brake drum 11 so as to prevent the winding drum 10 from rotating. If desired, the spring 18 could be replaced by a weight (not shown) of suitable size.

The above described apparatus is essentially conventional and admits of manual operation as is; i.e., the operator can lift up on the right-hand end of the brake arm 15 so as to release the brake whenever he feels that it is desirable to increase the weight on the drill bit. The elements which constitute the automatic control system of the present invention, and which will be described hereinafter, may now be added to the above described conventional apparatus without requiring any further changes or modifications of the existing rig structure. Conversely, after attachment, the elements of the instant automatic control system may be simply removed, or otherwise disabled, and the rig may be operated manually in the prior conventional manner.

In accordance with the present invention there is provided a weight-sensing mechanism consisting of a hydraulic sensing unit 21 which has a sensing plunger 22 urged against the dead line 3. This sensing unit 21 also includes a pair of cable guides 23 and 24 through which the cable 3 is permitted to pass. Preferably, one of these cable guides is firmly secured to the cable, the other allowing the cable to slide freely therethrough. Thus, the sensing plunger 22 contacts the portion of the cable 3 between the two cable guides 23 and 24. A suitable hydraulic fluid is introduced into the sensing device 21 through a suitable fitting (not shown) which is closed when the sensing system is filled to the desired level.

A conduit 28 connects with the sensing device 21 and transmits the fluid pressure therein to a control means, diagrammatically indicated by the reference numeral 29 in FIGURE 1. The control means is supplied with a source of air under pressure through the conduit or line 30. The output (controlled) air pressure from the controller 29 is transmitted through the conduit 33 to the various elements which are controlled by the air pressure, as will hereinafter appear. The manner in which the controller 29 operates will also be described briefly hereinafter.

An air motor 34, known per se, is mounted on a support 35 adjacent the brake arm 15. In the simplified form of the invention shown in FIGURE 1, the air motor 34 is connected to the output, or controlled pressure, line 33 of the controller 29 through a quick release valve 36, also known per se. Also, as shown in FIGURE 1 the air motor 34 has an arm 38 actuated by the motor and a cable 39 extending from one end of the arm 38 around a pulley 40 and to one end of the brake arm 15 adjacent the spring 18.

The pulley 40 is mounted on an overhead support 41 which is attached to the upper end of the support 35.

Figure 2:
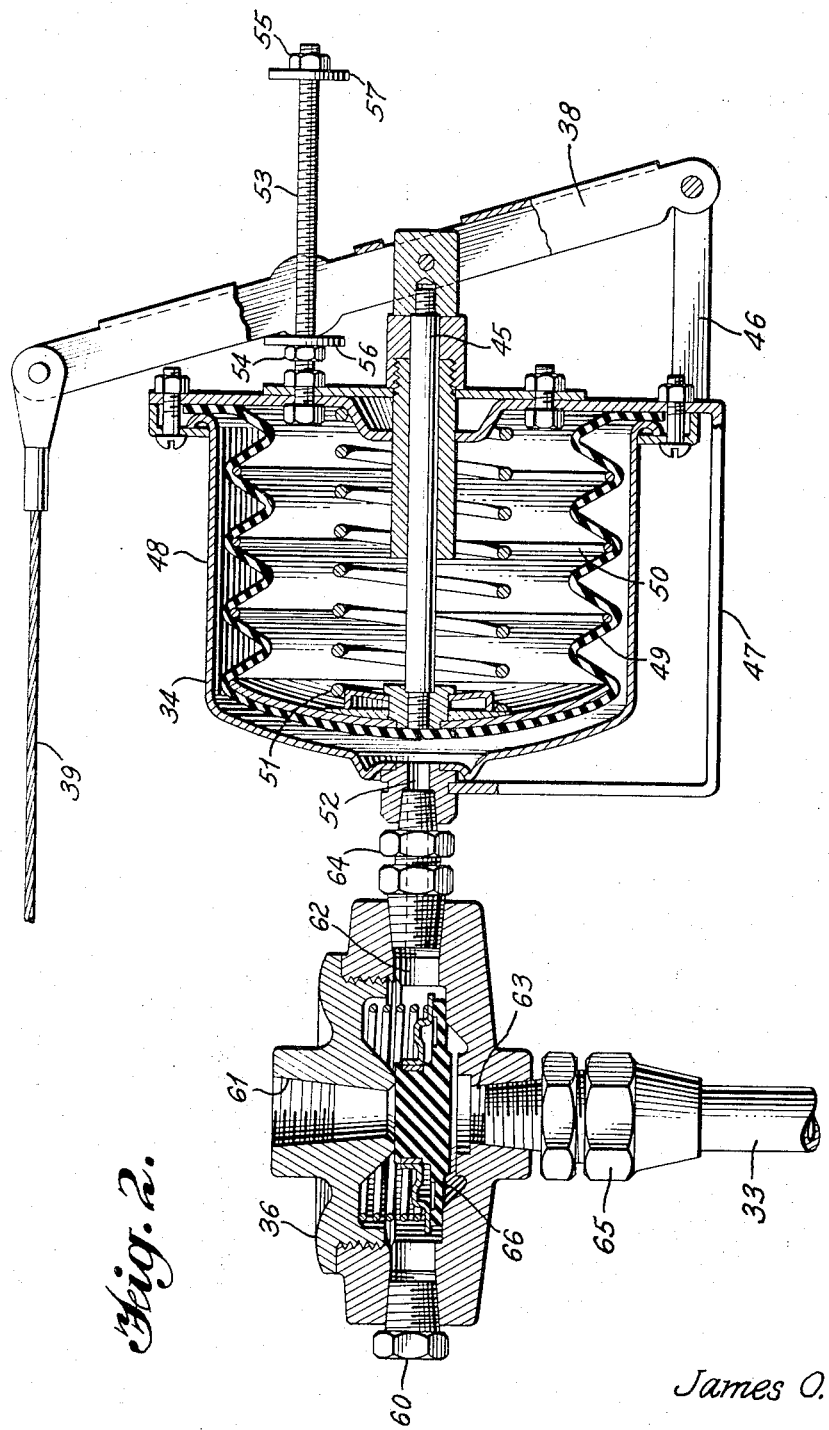
FIGURE 2 is a sectional view, on an enlarged scale, of the airmotor and its associated quick-release valve shown in FIGURE 1.

The air motor 34 and quick release valve 36 are shown in further detail in FIGURE 2 and will be briefly described as follows:

The air motor 34, which is essentially of a conventional design, comprises a spring loaded plunger 45 which is pivotally attached at its outer end to the arm 38. The arm 38 is pivotally attached at its lower end to a bracket 46 mounted on the base 47 of the air motor. The air motor also includes an air-tight casing 48 and a bellows-type diaphragm 49, the latter being secured at one end to the inner end of the spring loaded plunger 45. Two helical springs 50 and 51 are located internally of the diaphragm 49 for the purpose of urging the diaphragm and the plunger to the left. The casing 48 is provided with an external opening 52 at which a suitable fitting is located. A threaded horizontal rod 53 is also secured to the right-hand portion of the casing 48 for the purpose of providing limits for the pivotal movement of the arm 38. For this last-mentioned purpose there are provided nuts 54 and 55 and washers 56 and 57.

The quick release valve 36 includes a plurality of ports 60, 61, 62 and 63. The port 60 is plugged; the port 61 is connected with the atmosphere; the port 62 is connected to the opening 52 of the casing 48 of the air motor 34 by means of a connection 64; the remaining port 63 is connected to the source of controlled air pressure by means of a connection 65. The internal portion of the quick release valve 36 includes a flexible and spring-loaded diaphragm 66 which is shown in its normal condition of repose in FIGURE 2. The diaphragm 66 has the ability to provide controlled air pressure from the line 33 through the port 62 to the air motor 34 when the controlled air pressure is so provided through the conduit 33. However, when the air pressure in the conduit 33 falls below the pressure previously supplied to the air motor 34, the diaphragm 66 in the quick release valve 36 will move so that the air within the air motor will be permitted to pass backwardly through the quick release valve through the port 61 to the atmosphere. Thus, when the air pressure within the conduit 33 falls below a certain value, the air motor 34 is immediately cut off due to the venting action of the quick release valve 36. In the absence of the quick release valve 36, there would be a certain amount of lag in the operation of the air motor 34.

Figure 3:
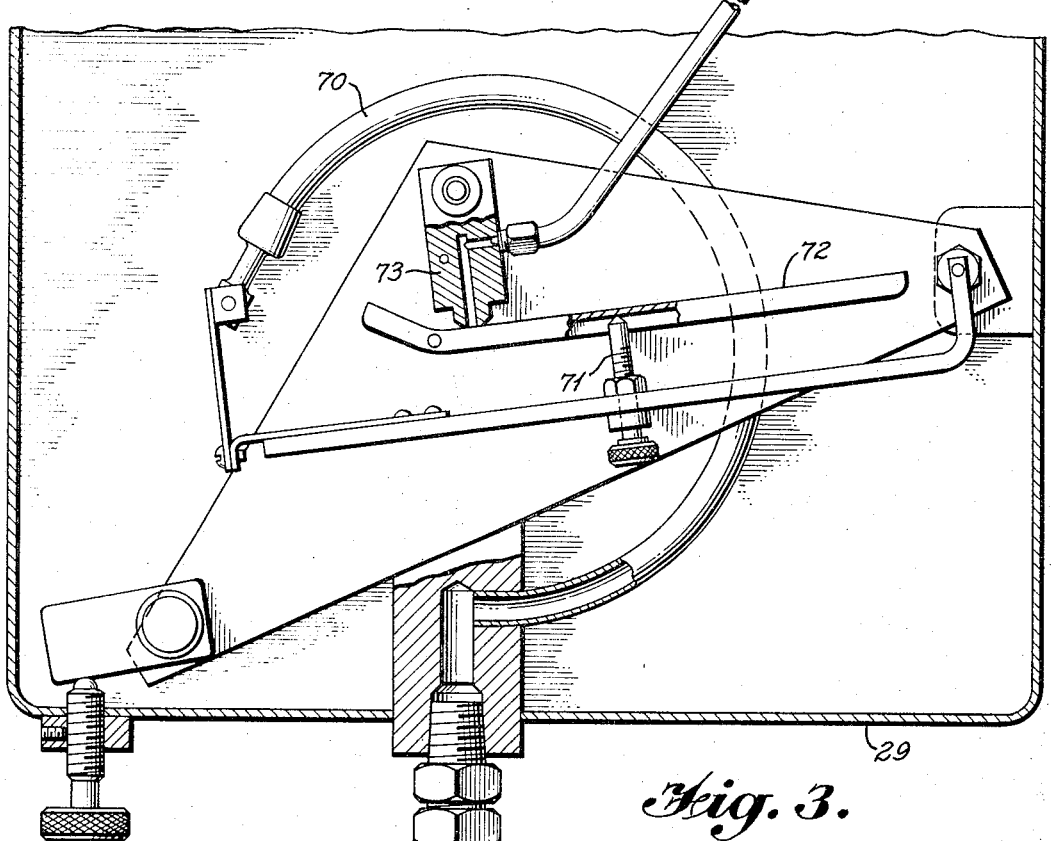
FIGURE 3 is a fragmentary view in elevation, partly diagrammatic and partly in section, showing in detail the controller illustrated in FIGURE 1.

FIGURE 3 shows, in a semi-diagrammatic manner, the operation of the controller 29. This controller is a standard purchased item, and no invention is claimed therein except as the same may be employed in combination with the remaining devices of the present invention. Air under pressure is supplied from the normal source of air pressure at the rig to the controller 29 through the conduit 30 appearing in the upper left-hand corner of FIGURE 3. The hydraulic pressure which effects the control within the controller 29 is conducted to the controller from the diaphragm on "deadline" through the conduit 28 appearing in the central lower portion of FIGURE 3. The controlled air outlet from the controller 29 appears as conduit 33 in the upper right-hand portion of FIGURE 3. The action of the controller will be briefly described as follows.

The Bourdon tube 70 moves in accordance with the fluctuation of hydraulic pressure in the conduit 28 so as to move the proportional pivot 71 correspondingly.

Movement of the proportional pivot 71 will cause movement of the flapper 72 towards or away from the nozzle 73. A diaphragm operated valve 74 is located in the upper central portion of the casing 29. This valve connects with the inlet conduit 30 through a pressure indicator 75 and a pipe 76. The valve 74 also connects with the outlet conduit 33 through a second pressure indicator 77 and a pipe 78. The nozzle 73 connects with an upper chamber 79 in the valve 74 through a conduit 80. This upper chamber 79 connects with the air supply through a channel 81 and restrictions 82 in the two diaphragm members 83 and 84. When the nozzle 73 is closed by the flapper 72 (as shown in FIGURE 3) the pressure in the chamber 79 will be essentially the same as that of the inlet pressure and the diaphragms 83 and 84 will be in the positions shown in FIGURE 3 such that the inlet air pressure will pass through the channel 85 into the lower chamber 86. From this lower chamber 86 the air pressure will pass through the lower cone of the valve stem 87 and into the central chamber 88 from which it passes through the pipe 78 and the pressure indicator 77 to the outlet conduit 33.

If the pressure in the Bourdon tube decreases (representing a condition where the tension in the dead line 3 decreases), the flapper 72 would move relative to the nozzle 73 so as to permit the escape of air to the atmosphere from the nozzle 73. This would result in a lowering of the pressure in the chamber 73 such that the diaphragms 83 and 84 would be pushed upwardly under the action of the spring 91. At the same time, the valve stem 87 would also be moved upwardly under the influence of the spring 92. The central chamber 88 would thus be cut off from communication with the lower chamber 86 due to the closure of the lower cone of the valve stem 87 against its corresponding seat. The central plug 93 separating the two diaphragms 83 and 84 would be moved upwardly relative to the upper cone of the valve stem 87 so as to permit bleeding of the air from the central chamber 88 through the chamber 96 to the atmosphere. Thus, the pressure in the outlet conduit 33 is reduced whenever the pressure in the Bourdon tube decreases. The pressure in the central chamber 88, and hence in the conduit 33, will depend upon the relative positions of the flapper 72 and the nozzle 73. These last-mentioned relative positions are determined by the hydraulic pressure in the Bourdon tube 70.

FIGURE 4 shows a governor or safety device employed for the purpose of preventing the drill string from being lowered too fast, as for example, when the drill bit should pass into a gas pocket or the like. The governor includes a friction wheel 100 keyed to a shaft 101. The friction wheel 100 is adapted to bear against the outer peripheral flange of the winding drum 10 (as shown in FIGURES 1, 5 and 6). The casing 102 of the governor also includes a concentrically mounted shaft 103 which is driven by the shaft 101 through suitable gearing inside the casing 102. The gearing is considered as essentially conventional and hence is not shown. A cross bar 104 is secured to the shaft 103 for rotation therewith. A pair of fly weights, generally designated by the reference character 105, are pivotally mounted (as at 106) adjacent the opposite ends of the cross bar 104. Each fly weight 105 has an inner arm 107 adapted to bear against a flange 108 of a slidable sleeve 109. At the right-hand end of the casing 102, as it appears in FIGURE 4, a slidable piston 110 is mounted in a cylindrical opening 111. A suitable spring 112 bearing against the right-hand end of the piston 110 and against the left-hand of a threaded rod 113 urges the piston 110 towards the left at all times. The threaded rod 113 is provided with a knob 114 for the purpose of permitting adjustment in the compression of the spring 112. The left-hand end of the slidable piston 110 is provided with a disc 115. The disc 115 is urged towards the left against a ball 116 which, in turn, is urged against the right-hand end of the slidable sleeve 109.

The upper right-hand part of the housing 102 includes a valve portion 120 to which is connected a conduit 121 containing air under pressure (from a source later to be described). The valve portion 120 also includes a slidable valve stem 122 which is urged towards the left under the action of the spring 123 so as to hold the conical portion 124 of the valve in its corresponding seat.

If the winding drum 10 were now rotating too rapidly, its rotary movement would be transmitted through the friction wheel 100, through the shaft 101 and to the shaft 103. At a rapid rotary speed of the shaft 103, the fly weights 105 would be thrown centrifugally outward such that the arms 107 on the fly weights would bear against the flange 108 of the slidable sleeve 109, moving the sleeve towards the right. This movement of the sleeve 109 would be accompanied by a corresponding movement of the piston 110 to the right, such that the disc 115 would bear against the valve stem 122, moving the conical portion 124 away from its seat so as to vent the pressure in the conduit 121 to the atmosphere through the opening 126.

Casing 102 is pivotally mounted, as at 127, on a pair of vertical standards 128 (only one of which is shown in FIGURE 4). The vertical standards 128 are secured at their lower ends to a base support 129. A spring 130 connects with a lug 131 at the lower right-hand portion of the casing 102 and also with a lug 132 on the base 129 so as to urge the casing 102 in a pivotal direction (with respect to the standards 128) tending to force the friction wheel 100 out of contact with the peripheral flange on the winding drum 10.

An air clamp 135 is mounted on the base 129 for the purpose of urging the casing 102 in a pivotal direction opposite to that effected by the spring 130 so as to bring the friction wheel 100 into contact with the peripheral flange of the winding drum 10. This air clamp is connected to a primary source of pressure (as will hereinafter appear) through a conduit 136. A vertically movable plunger 137 is mounted within a central cylindrical chamber 138 in the air clamp 135. A short rod 139, connected at its lower end to the center of the plunger 137, projects outwardly through an appropriate hole in the air clamp 135. A small vent 140 is also provided in the upper portion of the clamp 135 and leading to the central chamber 138.

When a source of air under pressure is supplied to the conduit 136 and to the central chamber 138, the plunger 137 and the rod 139 will be moved vertically upwards. The rod 139, contacting the lower right-hand portion of the casing 102, will pivot the casing 102 in a counter-clockwise direction, about the pivotal points 127, so as to urge the friction wheel 100 into engagement with the peripheral flange on the winding drum 10. This last described condition represents the operating position of the governor shown in FIGURE 4. The base 129 with its appropriate supporting structure is mounted in a position adjacent the winding drum so that the friction wheel 100 can be caused to bear against a peripheral flange of the winding drum 10 in the manner described above.

FIGURE 5 shows a pneumatic circuit diagram which is designed for completely automatic operation. The air supply which is available at any conventional rig passes into the system through the inlet conduit 150 and to the air scrubber 151 (later to be described in greater detail). From the air scrubber 151, the pressurized air passes through a pressure regulator-filter 152, which is essentially of conventional design and will not be further described in greater detail. From the pressure regulator 152, the air supply passes through a manual cut-off valve 153 and to the conduit 30 connecting with the controller 29. The conduit 136 leading to the air clamp 135 connects through the conduits 154 and 155 in series to the high pressure side of the conduit 30, as shown. Thus, when the system is turned on, pressure is supplied to the air clamp 135 irrespective of what happens to the elements shown at the right in this figure.

The outlet conduit 33 from the controller connects with a "positive action" relay 160 having an outlet conduit 161. The positive action relay is a standard purchased item, known per se, which will not be further described except briefly as follows: The output pressure delivered by the positive action relay from its outlet conduit 161, will be equal to, or proportional to, the pressure coming in to the relay through the conduit 33. However, if the pressure within the conduit 33 rises above a predetermined level (for which a suitable setting has been provided internally of the positive action relay), the relay will be tripped internally such that the output pressure at the conduit 161 will be reduced to zero. In other words, this positive action relay is a pneumatic safety device to stop the action of the driller in case of a twist-off or when drilling into a cavity.

The outlet conduit 161 of the relay 160 feeds air under controlled pressure to one-to-one relay 162 through conduit 163. The relay 162 connects with the high pressure source in the conduit 155 through a conduit 164 and a valve 165. The outlet conduit 166 of the relay 162 connects with the quick release valve 36 which has been previously described. From the quick release valve 36, the controlled air is conducted to the air motor 34 in the manner as previously described. The action of the relay 162 is such that, when pressure is in the conduit 163, the valve will permit air to pass from the conduit 164 into the outlet conduit 166 for the purpose of operating airmotor 34.

The outlet conduit 161 also connects with another conduit 170 through a check valve 171 to the conduit 121 leading to the governor casing 102. Thus, as previously described with relation to the operation of the governor shown in FIGURE 4, when the speed of the winding drum increases above a certain predetermined value, the air will be vented from the conduit 121 to the atmosphere. This loss of pressure in the conduit 121, and hence in the conduit 170, will cause a sufficient reduction in pressure in the line 163 as to prevent subsequent operation of the airmotor 34; in fact, the airmotor 34 will be shut off so as to stop the winding drum 10.

FIGURE 6 shows a modification of the system shown in FIGURE 5 which is employed when exceedingly fast response is desired. FIGURE 6 includes, in addition, a three-to-one relay 180 and a three-way valve 181. The three-to-one relay is connected to the pressure source to the left of the filter 152 by means of a conduit 182. The one-to-one relay 162 is connected to the conduit 182 through conduit 183 and valve 184. The output from the one-to-one relay is connected to the three-to-one relay through the conduit 185 and to the three-way valve through the conduit 186. The output of the three-to-one relay is connected to a three-way valve through the conduit 187. The output from the three-way valve is connected to the quick release valve 36 through the conduit 188. The operation of the airmotor 34 and the quick release valve 36 will be the same as that described previously. The advantage of the employment of the three-to-one relay and the three-way valve, which will be further described hereinafter, is that the three-to-one relay allows an amplification of pressure at the rate of three pounds of output to one pound of input pressure differential. The three-to-one relay is controlled by the output of the one-to-one relay, and the two relays 162 and 180 together operate the three-way valve 181 in a manner to be described hereinafter. FIGURE 6 also shows a manually operated valve 189 which can be employed for the purpose of disconnecting the governor from the system. Also shown is a disconnect-coupler 190 (which is also shown in FIGURE 5) which may be employed for the purpose of disconnecting conduit 136 from the source of high pressure when it is desired to disable the governor.

FIGURE 7 shows the details of the one-to-one relay 162. This relay is known per se, but since it is employed in combination in the present invention, it will be described briefly as follows: The one-to-one relay includes an upper casting 200 in which is located inlet port 201 for the controlled supply of air. The bottom casting 202 includes an inlet port 203 for the high pressure air and an outlet port 204 for the air which is controlled by the valve itself. A central casting 205 having an atmospheric passage 206 is interposed between the castings 200 and 202 as illustrated on the drawing. Also included are a neoprene sealing ring 207, a metal diaphragm 208 having therein a central hole 209, and a pair of neoprene diaphragms 210 and 211. The diaphragm 210 is secured between the upper casting 200 and the central casting 205; the lower diaphragm 211 is secured between the central casting 205 and the lower casting 202.

A spool-shaped pressure plate 213 is interposed between the two diaphragms 210 and 211 and is secured to the bottom diaphragm 211 by means of the nut 214 and washer 215. The nut is conveniently screwed onto the lower threaded portion 216 of the pressure member 213. The pressure plate 213 is provided with a vertical hole 218 and a laterally extending conduit 219 which communicates with the opening 206 in the central casting 205. The lower end of the vertical hole 218 provides a seat for the upper conical portion 220 of the valve stem 221. The lower portion of the bottom casting 202 is provided with a cylindrical opening 222 whose lower end is enclosed by a threaded cap 223 which is threaded into the bottom casting 202. A spring 224 received in the cylindrical opening 222 presses upwardly against the lower end of the valve stem 221. An inclined bore 225 leads from the inlet port 203 to the cylindrical chamber 222, and an opening 226 connects the upper end of the cylindrical chamber 222 with the space provided in the bottom casting 202 below the spool-shaped pressure plate 213. The lower end of this hole 226 provides a seat for the lower cone 227 of the valve stem 221.

Thus, when the pressure of the air supplied to the port 201 increases, the two diaphragms 210 and 211 will be pushed downwardly such that the valve stem 221 will be also pushed downwardly against the action of the spring 224; this will move the lower cone 227 of the valve stem 221 from its seat so as to permit the high pressure air to pass from the port 203 through the bore 225, through the cylindrical opening 222, through the opening 226, and to the outlet 204. When the pressure of the air supplied to the port 201 drops, the spool-shaped pressure plate 213 will be moved upwardly so as to seat the lower cone 227 against the lower portion of the hole 226 thereby preventing further air under pressure from passing to the outlet port 204. If the pressure at the outlet port at this time exceeds the pressure at the inlet port 201, the spool-shaped pressure plate 213 will be moved further upwardly so as to provide clearance between the upper cone 220 of the valve stem 221 and its corresponding seat at the lower end of the vertical hole 218; thus excess pressure at the outlet port 204 will be dissipated through the channels 218 and 219 to the atmosphere through the opening 206.

The relationship between the sizes of the diaphragms in the valve shown in FIGURE 7 is such that a differential pressure of one pound is supplied at the outlet port 204 for each differential pressure of one pound introduced at the inlet port 201.

The valve shown in FIGURE 8 is similar to the valve shown in FIGURE 7, the sole difference being that the air pressure provided at the outlet port 204 is an amplification of the pressure provided at the controlled inlet port 201. In FIGURE 8, like parts are given the same reference numbers as shown in FIGURE 7. In the valve shown in FIGURE 8, the upper neoprene diaphragm 210 is of the same size as the diaphragm 210 of FIGURE 7; however, the lower neoprene diaphragm 211' is smaller than the corresponding neoprene diaphragm 211 of FIGURE 7. Also, in FIGURE 8 the intermating parts of the center casting 205' and the bottom casting 202' are differently shaped from the corresponding members 205 and 202 in FIGURE 7, particularly in the region where the neoprene diaphragm 211' is designed to be secured between these two members. Also, the pressure plate 213' is shaped somewhat differently from the corresponding pressure plate 213 of FIGURE 7 for the very reason that the lower neoprene diaphragm 211' is smaller than its corresponding counterpart in FIGURE 7. Otherwise, the remaining elements shown in FIGURE 8 are substantially the same as their corresponding counterparts in FIGURE 7.

The relationship between the relative sizes of the diaphragms 210 and 211' in FIGURE 8 is such that, for each one pound increment of pressure supplied at the port 201 a three pound increment of pressure is produced at the outlet port 204.

The three-way valve 181, shown in detail in FIGURE 9, is also a standard commercial item known, per se, but the same will be described briefly as follows in view of the relationship that this valve bears in the combination of the present invention.

The three-way valve consists essentially of a diaphragm 230 which is spring loaded by means of a spring 231 and an adjustable screw 232 at the upper end of the valve, the screw permitting a decrease or increase in the compression on the spring 231. Air under controlled pressure is introduced to the three-way valve through the conduit 186 and into the chamber immediately below the diaphragm 230. Thus, as the pressure in the conduit 186 increases, the diaphragm 230 will be pushed upwardly. The upward movement of the diaphragm 230 will permit the valve stem 233 to move upwardly under the influence of the high pressure air supplied through the conduit 187 at the lower end of the three-way valve 181. The uppermost end of the valve stem 233 bears against the central portion of the diaphragm 230. The lower end of the valve stem 233 is provided with a conical portion 234 which seats at the upper end of a vertical bore 235 which communicates with the conduit 187. The upper end of the conical portion 234 is provided with a horizontal flange 236 which is adapted to seat against a projection 237 for the purpose of providing a high pressure cut-off. When the pressure of the controlled air in the chamber below the diaphragm 230 rises to a certain value, which permits the valve stem 233 to be elevated under the action of high pressure air, the high pressure air will be transferred through the inclined bore 240 to the outlet conduit 188 and thence to the air motor. The inclined bore 241 is provided as a vent to the atmosphere.

In view of the explanation advanced above with respect to FIGURES 7, 8 and 9, it should be apparent that the diagram of FIGURE 6 provides, in particular relation to the one-to-one relay 162, the three-to-one relay 180, and the three-way valve 181, a system having a faster response than that shown in FIGURE 5.

In FIGURE 10 (see also FIGURES 5 and 6) the air scrubber 151 is shown in greater detail. Actually, the air under pressure passes from the conduit 150 into a hollow tube 250 which extends downwardly into the interior of the air scrubber 151, terminating at a point approximately midway of the vertical length of the scrubber. The lower end of the tube 250 is bent at a slight radius so as to point towards the wall of the tank 151. As best shown in FIGURE 10, the tube 250 passes downwardly through a T 251 and through a nipple 252 which has an internal diameter somewhat in excess of the outer diameter of the tube 250. Thus, the air can pass downwardly through the tube 250, into the interior of the scrubber 151, out through the space between the tubing 250 and the nipple 252, and out of the side port 253 on the T 251. As best shown in FIGURES 5 and 6 the air scrubber 161 is provided with a drain valve 254 at the lower end thereof.

Whereas the present invention has been described in particular relation to the drawings attached hereto, it should be understood that other and further modifications, apart from those shown or suggested herein, might be made within the spirit and scope of this invention.

What is claimed is:

1. In a drilling rig including a frame, an upper pulley block secured to said frame, a lower movable pulley block, upper and lower pulleys rotatably mounted within said pulley blocks, respectively, a drill string supported from said lower block, a rotatable cable drum, a cable wound on said cable drum passing around said pulleys of said pulley blocks and secured at one end of said frame whereby the unwinding of said cable drum will cause said drill string to descend, and a brake means normally bearing against said cable drum so as to prevent rotation of the same, the improvement which comprises an automatic control system including a weight sensing device containing fluid therein and having a sensing element bearing against said cable, said sensing element being movable in response to the changes in tension in said cable for producing in said sensing device a fluid pressure in said fluid proportional to the tension in said cable, a fluid-pressure responsive actuator attached to said brake means and adapted upon energization to release said brake means, a controller connected between said sensing device and said actuator for increasing the fluid pressure in said actuator for energizing said actuator in response to an increase in fluid-pressure in said sensing device and so as to release said brake when the tension in said cable exceeds a first predetermined value, means for venting the pressure in said actuator to the atmosphere for deenergizing said actuator immediately when the tension in said cable decreases, and means for effecting engagement of said brake means when the tension in said cable exceeds a second predetermined value.

2. Apparatus according to claim 1 wherein said additional means for effecting engagement of said brake means includes a valve interposed between said controller and said actuator for preventing said controller from further energizing said actuator when the tension in said cable exceeds said second predetermined value.

3. In a drilling rig including a frame, an upper pulley block secured to said frame, a lower movable pulley block, upper and lower pulleys rotatably mounted within said pulley blocks, respectively, a drill string supported from said lower block, a rotatable cable drum, a cable wound on said cable drum passing around the pulleys of said pulley blocks and secured at one end to said frame whereby the unwinding of said cable drum will cause the drill string to descend, and a brake means normally bearing against said cable drum so as to prevent rotation thereof, the improvement which comprises an automatic control system including a weight sensing device having a sensing element bearing against said cable adjacent the fixed end thereof, said sensing element being movable in response to the changes in tension in said cable, a pressure controller having therein a valve and a valve moving means, said valve having an inlet connected to a primary source of air under pressure and an outlet supplying air from said primary source at a variable pressure depending upon the movement of said valve by said valve moving means, means connecting said valve moving means of said controller with said sensing device and forming a closed fluid circuit, said sensing element, when moving in response to changes in tension in said cable producing a fluid pressure in said closed fluid circuit proportional to the tension in said cable, said means connecting said sensing device with said valve moving means transmitting the change in fluid pressure caused by the movement of said sensing element to said valve moving means for moving said valve in accordance with the change in pressure in said closed fluid circuit, the pressure of air at the outlet of said valve thereby varying in accordance with the changes in tension in said cable, an airmotor mounted adjacent said brake means and having thereon an arm movable in accordance with pressure in said airmotor, and a brake cable connected from one end of said arm to said brake means, a quick release valve, said airmotor having an inlet connected to the outlet of said controller through said quick release valve, said airmotor when the air pressure therein increases in accordance with the increase of air pressure thereto from said controller through said quick release valve moving said arm so as to tension said brake cable and release said brake means, said quick release valve having therein means for venting the pressure within said airmotor to the atmosphere when the outlet air pressure from said controller decreases.

4. In a drilling rig including a frame, an upper pulley block secured to said frame, a lower movable pulley block, upper and lower pulleys rotatably mounted within said pulley blocks, respectively, a drill string supported from said lower block, a rotatable cable drum, a cable wound on said cable drum passing around the pulleys of said pulley blocks and secured at one end of said frame, whereby the unwinding of said cable drum will cause the drill string to descend, and a brake means normally bearing against said cable drum so as to prevent rotation thereof, the improvement which comprises an automatic control system including a weight sensing device having a sensing element bearing against said cable adjacent the fixed end thereof, said sensing element being movable in response to the changes in tension in said cable, a pressure controller having therein a valve and a valve moving means, said valve having an inlet connected to a primary source of air under pressure and an outlet supplying air from said primary source at a variable pressure depending upon the movement of said valve by said valve moving means, means connecting said valve moving means of said controller with said sensing device and forming a closed fluid circuit, said sensing element, when moving in response to changes in tension in said cable producing a fluid pressure in said closed fluid circuit proportional to the tension in said cable, said means connecting said sensing device with said valve moving means transmitting the change in fluid pressure caused by the movement of said sensing element to said valve moving means for moving said valve in accordance with the change in pressure in said closed fluid circuit, the pressure of air at the outlet of said valve thereby varying in accordance with the changes in tension in said cable, a positive action relay having its inlet connected to the controlled outlet of said valve of said controller, the outlet of said positive action relay providing air under pressure proportional to the pressure of air at the inlet of said positive action relay, said positive action relay, when the pressure at its inlet exceeds a certain predetermined value automatically closing off its outlet, an airmotor mounted adjacent said brake means and having thereon an arm movable in accordance with pressure in said airmotor, and a brake cable connected from one end of said arm to said brake means, a quick release valve, said airmotor having an inlet connected to the outlet of said positive action relay through said quick release valve, said airmotor, when the air pressure supplied thereto from said positive action relay through said quick release valve, moving said arm so as to tension said brake cable and release said brake means, said quick release valve having therein means for venting the pressure within said airmotor to the atmosphere when said air pressure from said positive action relay decreases.

5. In a drilling rig including a frame, an upper pulley block secured to said frame, a lower movable pulley block, upper and lower pulleys rotatably mounted within said pulley blocks, respectively, a drill string supported from said lower block, a rotatable cable drum, a cable wound on said cable drum passing around the pulleys of said pulley blocks and secured at one end to said frame whereby the unwinding of said cable drum will cause the drill string to descend, and a brake means normally bearing against said cable drum so as to prevent rotation thereof, the improvement which comprises an automatic control system including a weight sensing device having a sensing element bearing against said cable adjacent the fixed end thereof, said sensing element being movable in response to the changes in tension in said cable, a pressure controller having therein a valve and a valve moving means, said valve having an inlet connected to a primary source of air under pressure and an outlet supplying air from said primary source at a variable pressure depending upon the movement of said valve by said valve moving means, means connecting said valve moving means of said controller with said sensing device and forming a closed fluid circuit, said sensing element, when moving in response to changes in tension in said cable producing a fluid pressure in said closed fluid circuit proportional to the tension in said cable, said means connecting said sensing device with said valve moving means transmitting the change in fluid pressure caused by the movement of said sensing element to said valve moving means for moving said valve in accordance with the change in pressure in said closed fluid circuit, the pressure of air at the outlet of said valve thereby varying in accordance with the changes in tension in said cable, an airmotor mounted adjacent said brake means and having thereon an arm movable in accordance with pressure in said airmotor, a brake cable connected from one end of said arm to said brake means, a quick release valve, said airmotor having an inlet connected to the outlet of said controller through said quick release valve, said airmotor, when the air pressure therein increases in accordance with the increase of air pressure supplied thereto from said controller through said quick release valve moving said arm so as to tension said brake cable and release said brake means, said quick release valve having therein means for venting the pressure within said airmotor to the atmosphere when said air pressure supplied from said controller decreases, a governor mounted adjacent said winding drum and including a pivotal casing, a first shaft mounted for rotation within said casing, a friction wheel mounted on said first shaft, a circumferential flange on said winding drum, an air clamp mounted beneath said casing of said governor for tilting said governor so as to effect engagement of said friction wheel with said circumferential flange on said winding drum, said air clamp being connected with said primary source of air pressure, a second shaft mounted within the said casing of said governor and being geared to said first shaft, said second shaft having thereon a slidable valve actuator, means mounted on said second shaft and movable in accordance with centrifugal force exerted thereon due to the rotary speed of said second shaft for moving said valve actuator in a given direction, a valve mounted in said casing of said governor and being opened by said valve actuator when the speed of said second shaft exceeds a predetermined value, and a conduit connecting said valve in said governor to the output of said controller, whereby, when the unwinding speed of said winding drum exceeds a certain value, the output of said controller will be vented to atmosphere through the valve in said governor.

6. In a drilling rig including a frame, an upper pulley block secured to said frame, a lower movable pulley block, upper and lower pulleys rotatably mounted within said pulley blocks, respectively, a drill string supported from said lower block, a rotatable cable drum, a cable wound on said cable drum passing around the pulleys of said pulley blocks and secured at one end to said frame, whereby the unwinding of said cable drum will cause the drill string to descend, and a brake means normally bearing against said cable drum so as to prevent rotation thereof, the improvement which comprises an automatic control system including a weight sensing device having a sensing element bearing against said cable adjacent the fixed end thereof, said sensing element being movable in response to the changes in tension in said cable, a pressure controller having therein a valve and a valve moving means, said valve having an inlet connected to a primary source of air under pressure and an outlet supplying air from said primary source at a variable pressure depending upon the movement of said valve by said valve moving means, means connecting said valve moving means of said controller with said sensing device and forming a closed fluid circuit, said sensing element, when moving in response to changes in tension in said cable producing a fluid pressure in said closed fluid circuit proportional to the tension in said cable, said means connecting said sensing device with said valve moving means transmitting the change in fluid pressure caused by the movement of said sensing element to said valve moving means for moving said valve in accordance with the change in pressure in said closed fluid circuit, the pressure of air at the outlet of said valve thereby varying in accordance with the changes in tension in said cable, a supply of air under pressure, an air cleaner and a pressure regulator connected in series with said supply of air and with the inlet to said valve of said controller for supplying a primary source of air for said controller, a positive action relay having an inlet connected to the outlet of said valve of said controller and having an outlet providing air under pressure proportional to the pressure of air at its inlet, said positive action relay, when the pressure at its inlet exceeds a certain predetermined value, automatically closing off its outlet, a pneumatic relay having a control portion connected to the outlet of said positive action relay, said pneumatic relay having a high pressure inlet connected with said primary source of air under pressure and having an outlet providing a variable pressure of air, an airmotor mounted adjacent said brake means and having thereon an arm movable in accordance with pressure in said airmotor, a brake cable connected from one end of said arm to said brake means, a quick release valve, said airmotor having an inlet connected to the outlet of said pneumatic relay through said quick release valve, said airmotor, when the air pressure therein increases in accordance with the increase of air pressure supplied thereto from said pneumatic valve through said quick release valve moving said arm so as to tension said brake cable and release said brake means, said quick release valve having therein means for venting the pressure within said airmotor to the atmosphere when said air pressure from said pneumatic relay decreases, a governor mounted adjacent said winding drum and including a pivotal casing, a first shaft mounted for rotation within said casing, a friction wheel mounted on said first shaft, a circumferential flange on said winding drum, an air clamp mounted beneath said casing of said governor for tilting said governor so as to effect engagement of said friction wheel with said circumferential flange on said winding drum, said air clamp being connected with said primary source of air pressure, a second shaft mounted within the said casing of said governor and being geared to said first shaft, said second shaft having thereon a slidable valve actuator, means mounted on said second shaft and movable in accordance with centrifugal force exerted thereon due to the rotary speed of said second shaft for moving said valve actuator in a given direction, a valve mounted in said casing of said governor and being opened by said valve actuator when the speed of said second shaft exceeds a predetermined value, and a conduit connecting said valve of said governor to the output of said controller, whereby, when the unwinding speed of said winding drum exceeds a certain value, the output of said controller will be vented to atmosphere through the valve in said governor.

7. Apparatus according to claim 6 including at least one additional pneumatic relay in series with said first-mentioned pneumatic relay and said airmotor, said additional relay amplifying the effect of said first-mentioned relay for providing a more rapid response of said airmotor.

8. In a drilling rig including a frame, an upper pulley block secured to said frame, a lower movable pulley block, upper and lower pulleys rotatably mounted within said pulley blocks, respectively, a drill string supported from said lower block, a rotatable cable drum, a cable wound on said cable drum passing around said pulleys of said pulley blocks and secured at one end to said frame whereby the unwinding of said cable drum will cause said drill string to descend, and a brake means normally bearing against said cable drum so as to prevent rotation of the same, the improvement which comprises an automatic control system including a weight sensing device containing hydraulic fluid therein and having a sensing element bearing against said cable, said sensing element being movable in response to the changes in tension in said cable for producing in said sensing device a fluid pressure in said hydraulic fluid proportional to the tension in said cable, a fluid pressure responsive actuator attached to said brake means and adapted upon energization to release said brake means, a controller connected between said sensing device and said actuator for energizing said actuator in response to an increase in fluid pressure in said sensing device and so as to release said brake when the tension in said cable exceeds a predetermined value, a safety means including means for deenergizing said actuator immediately when the tension in said cable decreases, a friction wheel bearing against a rotatable portion of said cable drum, a shaft driven by said friction wheel, and centrifugally operated means responsive to the rotary movement of said shaft for effecting engagement of said brake means when the rotary speed of said shaft exceeds a predetermined value.

9. In a drilling rig including a frame, an upper pulley block secured to said frame, a lower movable pulley block, upper and lower pulleys rotatably mounted within said pulley blocks, respectively, a drill string supported from said lower block, a rotatable cable drum, a cable wound on said cable drum passing around said pulleys of said pulley blocks and secured at one end to said frame whereby the unwinding of said cable drum will cause said drill string to descend, and a brake means normally bearing against said cable drum so as to prevent rotation of the same, the improvement which comprises an automatic control system including a weight sensing device containing hydraulic fluid therein and having a sensing element bearing against said cable, said sensing element being movable in response to the changes in tension in said cable for producing in said sensing device a fluid pressure in said hydraulic fluid proportional to the tension in said cable, a fluid pressure responsive actuator attached to said brake means and adapted upon energization to release said brake means, a controller connected between said sensing device and said actuator for energizing said actuator in response to an increase in fluid pressure in said sensing device and so as to release said brake when the tension in said cable exceeds a predetermined value, a safety means including means for deenergizing said actuator immediately when the tension in said cable decreases, a friction wheel bearing against a rotatable portion of said cable drum, a shaft driven by said friction wheel, and means responsive to the rotary movement of said shaft for effecting engagement of said brake means when the rotary speed of said shaft exceeds a predetermined value.

10. In a drill rig including a frame, an upper pulley block secured to said frame, a lower movable pulley block, upper and lower pulleys rotatably mounted within said pulley blocks, respectively, a drill string supported from said lower block, a rotatable cable drum, a cable wound on said cable drum passing around said pulleys of said pulley blocks and secured at one end to said frame whereby the unwinding of said cable drum will cause said drill string to descend, and a brake means normally bearing against said cable drum so as to prevent rotation of the same, the improvement which comprises an automatic control system including a weight sensing device containing hydraulic fluid therein and having a sensing element bearing against said cable, said sensing element being movable in response to the changes in tension in said cable for producing in said sensing device a fluid pressure in said hydraulic fluid proportional to the tension in said cable, a fluid pressure responsive actuator attached to said brake means and adapted upon energization to release said brake means, a controller connected between said sensing device and said actuator for increasing the fluid pressure in said actuator for energizing said actuator in response to an increase in fluid pressure in said sensing device and so as to release said brake when the tension in said cable exceeds a predetermined value, means for venting the pressure in said actuator to the atmosphere for deenergizing said actuator immediately when the tension in said cable decreases, and safety means for effecting engagement of said brake means when the unwinding speed of said cable drum becomes excessive.

11. In a drilling rig including a frame, an upper pulley block secured to said frame, a lower movable pulley block, upper and lower pulleys rotatably mounted within said pulley blocks, respectively, a drill string supported from said lower block, a rotatable cable drum, a cable wound on said cable drum passing around said pulleys of said pulley blocks and secured at one end of said frame whereby the unwinding of said cable drum will cause said drill string to descend, and a brake means normally bearing against said cable drum so as to prevent rotation of the same, the improvement which comprises an automatic control system including a weight sensing device containing hydraulic fluid therein and having a sensing element bearing against said cable, said sensing element being movable in response to the changes in tension in said cable for producing in said sensing device a fluid pressure in said hydraulic fluid proportional to the tension in said cable, a fluid pressure responsive actuator attached to said brake means and adapted upon energization to release said brake means, a controller connected between said sensing device and said actuator for increasing the fluid pressure in said actuator for energizing said actuator in response to an increase in fluid pressure in said sensing device and so as to release said brake when the tension in said cable exceeds a predetermined value, means for venting the pressure in said actuator to the atmosphere for deenergizing said actuator immediately when the tension in said cable decreases, a governor mounted adjacent said winding drum and including a pivotal casing, a first shaft mounted for rotation within said casing, a friction wheel mounted on said first shaft, a circumferential flange on said winding drum, an air clamp mounted beneath said casing of said governor for tilting said governor so as to effect engagement of said friction wheel with said circumferential flange on said winding drum, said air clamp being connected with said primary source of air pressure, a second shaft mounted within the said casing of said governor and being geared to said first shaft, said second shaft having thereon a slidable valve actuator, means mounted on said second shaft and movable in accordance with centrifugal force exerted thereon due to the rotary speed of said second shaft for moving said valve actuator in a given direction, a valve mounted in said casing of said governor and being opened by said valve actuator when the speed of said second shaft exceeds a predetermined value, and a conduit connecting said valve in said governor to the output of said controller, whereby, when the unwinding speed of said winding drum exceeds a certain value, the output of said controller will be vented to atmosphere through the valve in said governor.

12. A drilling control apparatus for controlling a rotatable cable drum for paying out cable into a cable system which is in tension including a rotatable cable drum having the cable wound thereon, braking means associated with and acting upon said cable drum to control the rotation of the drum as caused by the tension in the cable system, a pressure actuated power means connected with the braking means, a conductor for conducting an actuating pressure to said power means, a relay pressure control device in said conductor for applying actuating pressure to the power means, means responsive to the tension in the cable system for operating the relay pressure control device in accordance with variations in tension in said cable system, whereby the power means is actuated to pay out cable from the drum or to reduce or halt such payout in accordance with the tension in the cable system, an auxiliary pressure-venting unit in communication with the relay pressure control device at a point between said relay pressure control device and the means responsive to the tension in the cable system, said auxiliary unit including a discharge passage and a valve member movable with respect to said passage for opening and closing said passage and also including an operating element for imparting movement to the valve member, said operating element having operative connection with the cable drum whereby the opening and closing of the discharge passage is controlled solely in accordance with the rotation of said cable drum.

13. A drilling control apparatus for controlling a rotatable cable drum for paying out cable into a cable system which is in tension including, a rotatable cable drum having the cable wound thereon, braking means acting upon said cable drum, an actuator for controlling the braking means, means responsive to tension in the cable system and including fluid means for energizing and de-energizing the actuator to control the braking means and initiate or halt payout of cable from the drum, and an auxiliary control unit including a part having a discharge passage in communication with the energizing fluid means and a part movable with respect to said discharge passage to open and close the passage, said actuator being de-energized each time the passage is opened, said auxiliary control unit also including operating means operatively connected with said movable part and responsive solely to payout of cable from the cable drum and unaffected by the actuator and its energizing means, whereby the opening and closing of the discharge passage is controlled solely in accordance with the rotation of said cable drum.

14. A drilling control apparatus for controlling a rotatable cable drum for paying out cable into a cable system which is in tension including, a rotatable cable drum having the cable wound thereon, braking means acting upon said cable drum, a pneumatic actuating system responsive to the tension in the cable system and including an actuator having connection with the braking means for controlling said braking means to thereby control cable payout, pressure energization of said pneumatic actuating system operating its actuator to move the braking means in a direction which releases the cable drum for rotation to pay out cable, and an auxiliary control unit including a part having a discharge passage in communication with the pneumatic actuating system and a part which is movable with respect to said discharge passage to open and close the passage, the pressure in said pneumatic actuating system being reduced to de-energize the actuator each time the passage is opened, said auxiliary control unit also including operating means operatively connected to said movable part and responsive solely to the payout of cable from the cable drum and unaffected by the actuating system, whereby the opening and closing of the discharge passage is controlled solely in accordance with the rotation of said cable drum.

15. A drilling control apparatus as set forth in claim 13, wherein the operating means of the auxiliary control unit is responsive to cable payout by the engagement of said operating means with the cable drum, and means connected with said operating means for disengaging it from the drum to render said auxiliary unit inactive.

16. In combination, apparatus for controlling the weight applied to a drill bit assembly suspended from a traveling block which is, in turn, suspended from a crown block by a cable system having a dead line section and having a fast line section extending from a cable drum provided with braking means for paying out cable from said cable drum into the fast line section of the cable system, a pressure-operated actuating system responsive to and energized by the tension in the dead line section of the cable system and having connection with the braking means for controlling said braking means to control drum rotation as caused by the weight of the drill bit assembly to thereby control paying out of the cable into the cable system, energization of the pressure-operated actuating system operating the braking means to allow drum rotation in a direction to pay out cable and de-energization of said system operating said braking means in a direction to reduce the rate of payout of cable, and an auxiliary control unit including a valve means comprising a part having a discharge passage in communication with the actuating system and a part movable with respect to said passage to open and close the passage, the actuating system being de-energized each time said passage is opened, said auxiliary control unit also including operating means connected to the movable part of said valve means and responsive solely to payout of cable from the cable drum and being unaffected by the actuating system, whereby the opening and closing of the discharge passage is controlled solely in accordance with the rotation of said cable drum.

17. The combination as set forth in claim 16, wherein the operating means for the auxiliary control unit is in direct engagement with the cable drum whereby rotation of the drum operates the valve means of said control unit, and means mounting said operating means for movement relative to the drum to permit said operating means to be selectively disengaged from the drum and thereby render the auxiliary control unit inactive.

References Cited

UNITED STATES PATENTS

| Re. 18,947 | 9/1933 | Greve | 255—19.4 |
| 1,779,656 | 10/1930 | Brauer | 254—173 |
| 1,919,611 | 7/1933 | Besigk. | |
| 1,926,119 | 9/1933 | Smith | 254—173 |
| 2,455,917 | 12/1948 | Crake | 254—173 |
| 2,650,796 | 9/1953 | Abraham | 254—173 X |
| 2,759,702 | 8/1956 | Abraham | 254—173 |
| 2,867,411 | 1/1959 | Simmonds et al. | 254—173 |
| 2,944,789 | 7/1960 | LeGate | 254—173 |

SAMUEL F. COLEMAN, *Primary Examiner.*

H. R. MOSLEY, LEYLAND D. MARTIN,
                                           *Examiners.*

D. L. DENNISON, O. M. SIMPSON,
                                   *Assistant Examiners.*